United States Patent
Aoki

(10) Patent No.: US 6,685,553 B2
(45) Date of Patent: Feb. 3, 2004

(54) SEAT AIR CONDITIONING UNIT FOR VEHICLE

(75) Inventor: Shinji Aoki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/395,545

(22) Filed: Mar. 24, 2003

(65) Prior Publication Data

US 2003/0186642 A1 Oct. 2, 2003

(30) Foreign Application Priority Data

Mar. 28, 2002 (JP) ........................................ 2002-091316

(51) Int. Cl.⁷ ................................................ A47C 7/74
(52) U.S. Cl. ................... 454/120; 454/907; 297/180.14
(58) Field of Search ................................ 454/120, 907; 297/180.1, 180.13, 180.14, 452.42, 452.43, 452.46, 452.47

(56) References Cited

U.S. PATENT DOCUMENTS

| | | | |
|---|---|---|---|
| 5,597,200 A | | 1/1997 | Gregory et al. |
| 6,059,018 A | * | 5/2000 | Yoshinori et al. ............. 165/42 |
| 6,179,706 B1 | | 1/2001 | Yoshinori et al. |
| 2003/0102699 A1 | * | 6/2003 | Aoki et al. ............ 297/180.14 |

* cited by examiner

Primary Examiner—Jiping Lu
(74) Attorney, Agent, or Firm—Harness, Dickey & Pierce, PLC

(57) ABSTRACT

A seat air conditioning unit includes a seat defining an air passage in a seat member and a blower unit for blowing air into the air passage. The air passage includes an air introduction passage communicating with the blower unit, air distribution passages formed on a surface of a main pad of the seat member adjacent to a sub pad and through holes formed in the sub pad at portions corresponding to the air distribution passages. The air distribution passages extend from the air introduction passage toward the front and rear ends or the top and bottom ends of the seat. The through holes have openings on a surface of the sub pad adjacent to a cover. A dimension of each opening is greater than a dimension of the air distribution passage in a direction substantially perpendicular to a longitudinal direction of the air distribution passage.

12 Claims, 2 Drawing Sheets

SEAT AIR CONDITIONING UNIT FOR VEHICLE

CROSS REFERENCE TO RELATED APPLICATION

This application is based on Japanese Patent Application No. 2002-91316 filed on Mar. 28, 2002, the disclosure of which is incorporated herein by reference.

1. Field of the Invention

The present invention relates to a seat air-conditioning unit for a vehicle, which supplies conditioned air to a seat of the vehicle.

2. Background of the Invention

In a seat air conditioning unit for a vehicle disclosed in JP-A-2000-152849 (U.S. Pat. No. 6,179,706), air is introduced into an air passage formed in a seat by a blower unit, and blown from a seat surface. The air passage includes a plurality of air distribution passages extending along the seat surface and an air introduction passage introducing the air from the blower unit into the air distribution passages.

The air distribution passages are diverged from a downstream end of the air introduction passage and linearly extended in a front and rear direction or a top and bottom direction of the seat. Downstream ends of some air distribution passages are open at the sides of the seat. Also, the downstream end of the air introduction passage is located at a portion which receives seating pressure by a user.

Therefore, the air is not directly blown off from the seat surface just above the downstream end of the air introduction passage, but can be diverged into the air distribution passages from the downstream end of the air introduction passage. Further, the air can smoothly flow in the distribution passages without causing heat loss, thereby improving air conditioning performance.

However, since the air is blown through the seat surface along the air distribution passages extending in the front and rear or the top and bottom direction of the seat. Therefore, it is difficult to blow the air widely in the right and left direction of the seat. To provide expansion of the air conditioning effect, it may be possible to increase the number of the air distribution passages or to widen the air distribution passages. However, it is likely to decrease seating comfort.

SUMMARY OF THE INVENTION

The present invention is made in view of the above disadvantage, and it is an object of the present invention to provide a seat air conditioning unit for a vehicle that provides air conditioning effect widely over a seat surface without decreasing seating comfort.

According a seat air conditioning unit for a vehicle of the present invention, a seat has a seat member forming an air passage through which air blown by a blower unit flows and an air permeable seat surface member disposed on the surface of the seat member. The seat member includes a main pad and an air permeable sub pad. The sub pad is provided between the main pad and the seat surface member. The air passage includes an air introduction passage, a plurality of air distribution passages formed on a surface of the main pad adjacent to the sub pad and through holes formed in the sub pad at portions corresponding to the air distribution passages. The air introduction passage introduces air from the blower unit into the air distribution passages. The air distribution passages diverged from the air introduction passages and extend toward an end of the seat member. The through holes have openings on a surface of the sub pad adjacent to the seat surface member. A dimension of each opening is greater than a dimension of the air distribution passage in a direction substantially perpendicular to a longitudinal direction of the air distribution passage.

Air introduced in the air distribution passages is blown toward a seat user through the sub pad and the seat surface member. Since the dimension of the opening is greater than the dimension of the air distribution passage in the direction substantially perpendicular to the longitudinal direction of the air distribution passage, the flow of the air can expand while passing through the through holes. Therefore, the air can be blown toward the seat user widely over the seat surface member without increasing in the number and the width of the air distribution passages. Accordingly, the seat air conditioning unit can provide an air conditioning effect widely over the seat surface, without decreasing seating comfort.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
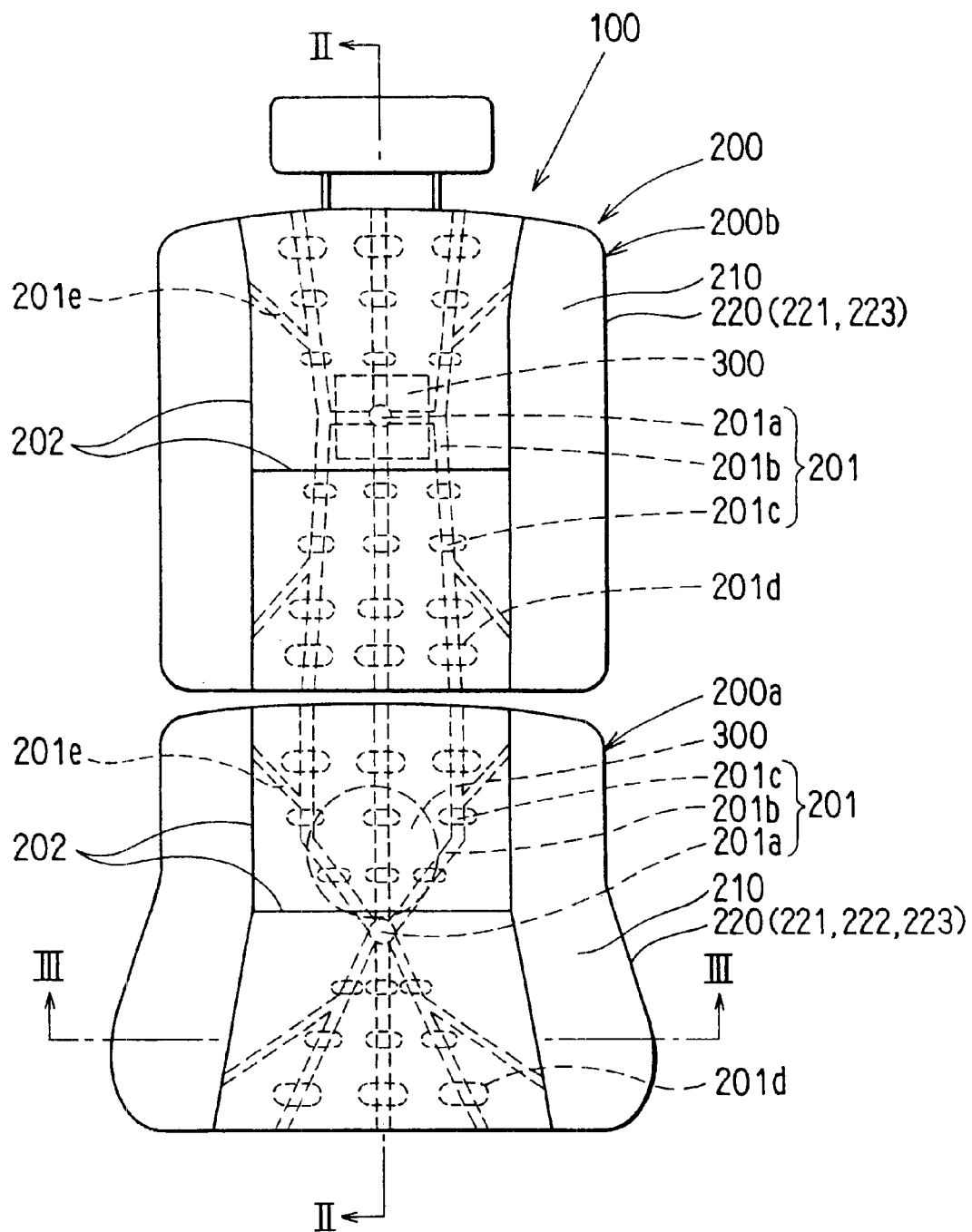
FIG. 1 is a plan view of a seat for explaining an air passage of a seat air conditioning unit for a vehicle according to an embodiment of the present invention.
Figure 2:
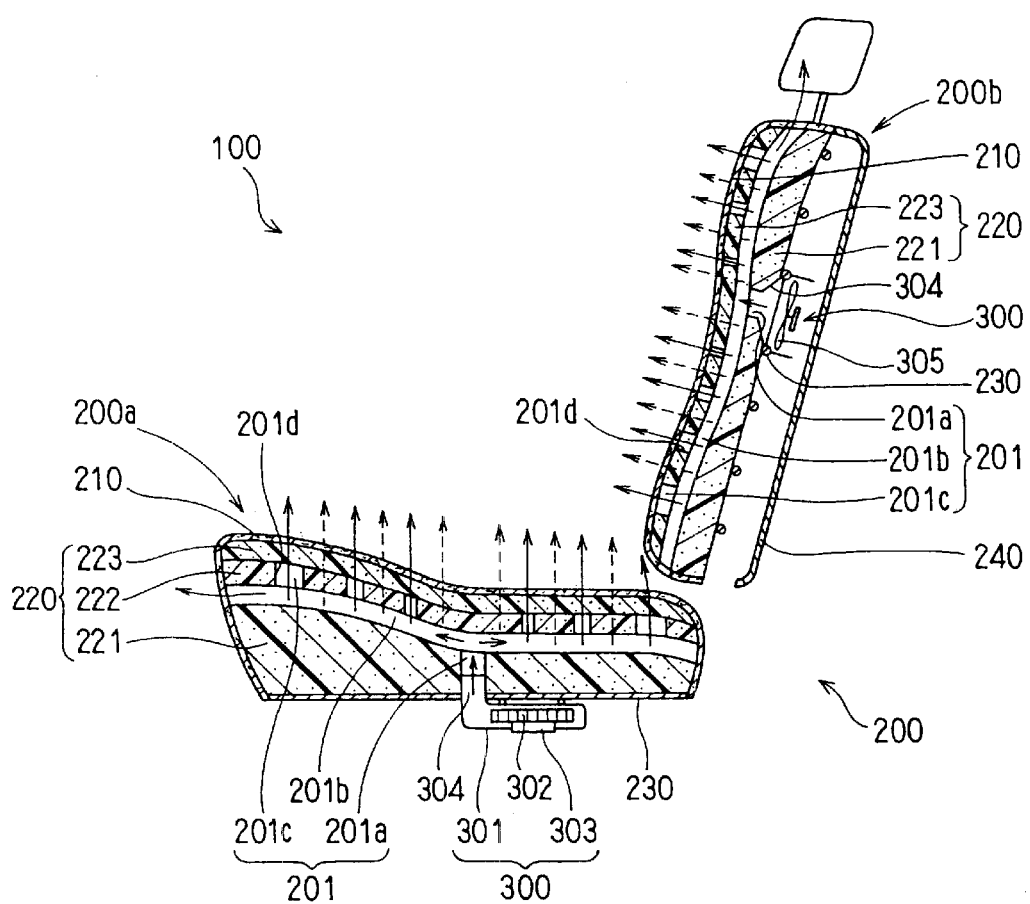
FIG. 2 is a cross-sectional view of the seat air conditioning unit taken along line II—II in FIG. 1.

As shown in FIGS. 1 and 2, a seat air conditioning unit 100 for a vehicle includes a seat 200 and a blower unit 300. The seat 200 includes a seat cushion (seat bottom) 200a for supporting a seat user's hip and a backrest (seat back) 200b for supporting the user's back. Each of the seat cushion 200a and the backrest 200b has a seat member 220 and a cover (seat surface member) 210 covering the seat member 220.

The cover 210 is used to enhance appearance and texture of the seat 200 and is for example made of fabrics having air permeability. When the fabric, the surface of which is coated with a backing material (e.g. resin) to avoid removal of fibers, is used, foaming process is performed to the backing material to provide air permeability. Alternatively, the cover 200 can be made of non-woven cloth or leather. In this case, a plurality of ventilation holes is formed to provide air permeability.

In the seat cushion 200a, the seat member 220 includes a main pad 221 as a main seat member, a placed pad 222 as a sub seat member and a cover pad 223. The seat member 220 is supported by a metallic supporting member 230 made of a S-spring, stabilizer or the like.

The main pad 221 is to receive the user's weight and is made of polyurethane. The placed pad 222 is to absorb a seating pressure from the user seated thereon and is made of polyurethane as a porous material. The placed pad 222 itself has air communication and air permeability. The cover pad 223 is to ease seating feeling when the user is seated on the seat 200. The cover pad 222 is made of polyester or polyurethane processed by continuous foaming and coat removing. Thus, the cover pad 222 has high air permeability.

The seat member 220 is formed with an air passage 201. The air passage 201 includes an air introduction passage 201a formed within the main pad 221, and air distribution passages 201b formed on the surface of the main pad 221, and through holes 201c formed within the placed pad 222.

The air introduction passage 201a is formed substantially at a center of the main pad 221 as a circular hole passing through the main pad 221 in a direction that the thickness of the main pad 221 is measured. The air introduction passage 201a introduces air blown by the blower unit 300 toward the surface of the main pad 221 adjacent to the placed pad 222, that is, into the air distribution passages 201b.

The air distribution passages 201b are provided of grooves that are formed on the surface of the main pad 221 adjacent to the placed pad 222. The grooves diverge from the downstream end of the air introduction passage 201a and substantially linearly extend to the front and rear ends of the seat member 220. The placed pad 222 is placed on the surface of the main pad 221. Therefore, the air distribution passages 201b are formed of the surface of the main pad 221 and the grooves formed on the placed pad 222. Downstream ends of the air distribution passages 201b are open at the front and rear ends of the seat member 220.

The grooves, which construct the air distribution passages 201b, have dimensions to avoid blockings of the air distribution passages 201b by the user's weight. Preferably, each of the grooves has a depth equal to or greater than 15 mm and a width equal to or greater than 10 mm. Here, the depth is 17 mm and the width is 15 mm.

The plurality of through holes 201c is formed in the placed pad 222 at portions corresponding to the air distribution passages 201b to communicate with the air distribution passages 201b. Openings 201d of the through holes 201c on the surface of the placed pad 222 for example have substantially elliptic shapes longitudinal in the left and right direction of the seat, as shown in FIG. 1. A dimension of the opening 201d in the left and right direction of the seat is greater than the width of the air distribution passage 201b.

The opening area or the dimension of the opening 201d gradually increases from the air introduction passage 201a toward a downstream of the air distribution passage 201b. That is, the opening 201d in the downstream position of the air distribution passage 201b is greater than the opening 201d in an upstream position of the air distribution passage 201b, as shown in FIG. 1. The through holes 201c are formed in the area that is separated from the downstream end of the air introduction passage 201a by a predetermined distance. That is, the through holes 201c are not formed at a portion just above the air introduction passage 201a.

The blower unit 300 is provided under the seat cushion 200a. The blower unit 300 includes a scroll casing 301 defining an air passage therein, a centrifugal fan 302 housed in the scroll casing 301, a motor for driving the centrifugal fan 302 and a duct 304 for guiding blown air to the air introduction passage 201a. The blower unit 300 is fixed to the support member 230. The duct 304 is connected to the air introduction passage 201a.

The blower unit 300 connects with a general air conditioning unit (not shown) mounted on the vehicle. When the centrifugal fan 302 rotates with operation of the motor 303, the blower unit 300 draws conditioned air from the air conditioning unit and forcibly blows it to the air passage 201 within the seat member 220. Alternatively, the blower unit 300 can draw conditioned air inside a passenger compartment without connecting with the air conditioning unit. Further, a sheet-like heater having ventilation holes can be provided between the cover 210 and the cover pad 223 to improve heating performance.

The backrest 200b has an air conditioning structure similar to that of the seat cushion 200a. However, the seat member 220 and the blower unit 300 of the backrest 200b are slightly different from those of the seat cushion 200a. In the backrest 200b, a backboard 240 is provided on a rear side of the seat member 220, as shown in FIG. 2.

The seat member 220 of the backrest 200b does not include the placed pad 222. The seat member 220 includes the main pad 221 and the cover pad 223. The seat member 220 is supported with the support member 230 such as a rod-like spring member. Further, in the backrest 200b, the through holes 201c are formed on the cover pad 223. The through holes 201c have a configuration and arrangement similar to those of the seat cushion 200a, as shown in FIG. 1.

The blower unit 300 of the backrest 200b has an axial flow fan 305, in place of the centrifugal fan 302. The blower unit 300 is fixed in a condition sandwiched between the support member 230 and the duct 304. Felt (not shown) can be provided on the support member 230 at a portion where the blower unit 300 is fixed, as a shock absorbing material.

Next, operation and advantages of the seat air conditioning unit will be described hereinafter.

With operation of the blower unit 300, conditioned air from the air conditioning unit or inside of the passenger compartment is sucked into the air introduction passage 201a. The air is introduced in the air introduction passage 201a and diverged in the front and rear direction or top and bottom direction of the seat 200 through the air distribution passages 201b. In the seat cushion 200a, the air passes through the placed pad 222, the cover pad 223 and the cover 210 and blows toward user's hip and thigh, as denoted by dotted-arrows in FIG. 2. In the backrest 200b, the air distributed in the air distribution passages 201b is blown toward the user's waist and back through the cover pad 223, and cover 210, as denoted by dotted-arrows in FIG. 2.

Further, the air expands in the left and right direction of the seat 200 while passing through the through holes 201c, and blows toward the user through the cover 210 as denoted by solid arrows in FIG. 2.

The air blow through the cover 210 is interrupted at a portion where the seating pressure of the user is applied. However, the flow of the air in the air distribution passage 201b improves an air convection and heat transmission toward the user.

The width of the openings 201d of the through holes 201c is greater than that of the air distribution passages 201b in the left and right direction of the seat member 202. Thus, the air can expand in the left and right direction while passing through the through hole 201c from the air distribution passage 201b and then flow through the cover pad 223. Accordingly, the air conditioning unit provides air conditioning effect in a wide area over the seat 200 without increasing in the number and the width of the air distribution passages 201b and without reducing the seating comfort.

The openings 201d in the downstream position of the air distribution passage 201b is larger than that in the upstream position of the air distribution passage 201b. Therefore, air flow resistance in the downstream of the air distribution passages 201b reduces. Accordingly, an amount of the air passing through the through holes 201c is uniformed irrespective of the distance from the air introduction passage 201a, thereby improving air conditioning performance over the seat 200.

Since the through holes 201c are provided in a predetermined distance separate from the air introduction hole 201a, it is less likely that the air will be directly blown from the air introduction passage 201a through the cover 210. Accordingly, the air can be distributed into the air distribution passages 201b, thereby improving the air conditioning effect over the seat 200.

Figure 3:
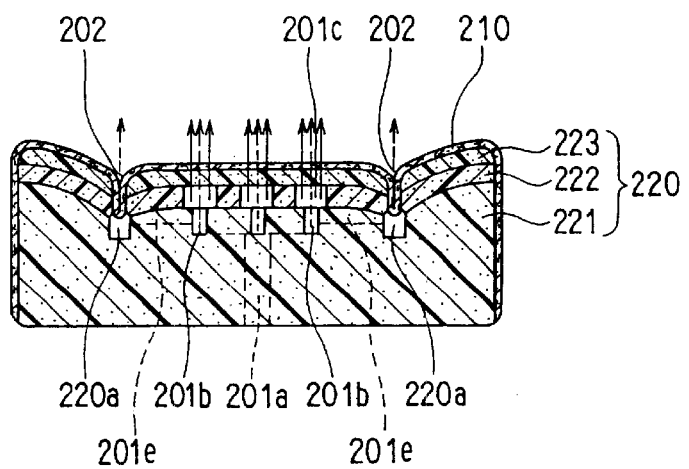
FIG. 3 is a cross-sectional view of a seat cushion of the seat taken along line III—III in FIG. 1.

In a case that the cover 210 is partially squeezed in grooves 220a formed in the seat member 220 as for a seat design, the grooves 220a can be used as a part of the air passage 201. As shown in FIG. 3, the squeezed portion 202 is squeezed in the grooves 220a and a wire is extended on the squeezed portion 202 of the cover 210. In this case, communication passages 201e can be formed on the main seat member 221 to communicate the grooves 220a with the grooves forming the air distribution passages 201b. Therefore, the air passage space can be increased, thereby improving air conditioning effect widely over the seat 200.

The communication passages 201e are formed to extend radially toward the periphery of the seat member 220 with respect to the air introduction passage 201a, as shown in FIG. 2. This makes the flow of the conditioned air smooth, thereby improving the air conditioning efficiency.

Since both the seat cushion 200a and the backrest 200b have the blower units 300, the air blow amount can be adjusted individually in the seat cushion 200a and the backrest 200b. Alternatively, the blower unit 300 can be provided one of the seat cushion 200a and the backrest 200b. In this case, the duct 304 can be diverged to the other one of the seat cushion 200a and the backrest 200b. The air is supplied to the seat cushion 200a and the backrest 200b through the duct 304.

To improve heating effect, bakuhanseki mineral stone, which has heating effect by far-infrared radiation, can be provided in the cover 210. This cover 210 may improve the blood flow of the user. The bakuhanseki mineral stone is crushed into small particles and for example buried in the cloth of the cover 210 or mixed in the backing material.

Other mineral stone such as tourmaline can be provided in the cover 210, in place of the bakuhanseki. User's fatigue is lessened or overcome by negative ion radiated from the tourmaline. The negative iron can be radiated by adding functions such as plasmacluster, electronic discharge and corona discharge to the blower unit 300.

Further, electret cloth made of such as polycarbonate, polypropylene and polyurethane can be provided in the seat member 220, for example, on the surface of the cover pad 223 adjacent to the main pad 221. The air is filtered with the cloth and blown toward the user.

In FIG. 1, the openings of the though holes 201c have substantially the elliptic shapes. However, the openings 201d have any other shapes as long as the air can expand in the left and right direction of the seat while passing through the through holes 201c. For example, the openings 201d have circular or rectangular shapes.

The present invention should not be limited to the disclosed embodiments, but may be implemented in other ways without departing from the spirit of the invention.

What is claimed is:

1. A seat air conditioning unit for a vehicle comprising:
a seat including a seat member forming an air passage through which air flows and an air permeable seat surface member disposed on a surface of the seat member; and
a blower unit for blowing air into the air passage,
wherein the seat member includes a main pad and a sub pad that is disposed between the main pad and the seat surface member, and the sub pad has air permeability,
wherein the air passage includes:
an air introduction passage communicating with the blower unit;
a plurality of air distribution passages formed on a surface of the main pad adjacent to the sub pad, the plurality of air distribution passages diverging from the air introduction passage and extending toward an end of the seat member; and
a plurality of through holes formed in the sub pad at portions corresponding to the air distribution passages, the through holes having openings on a surface of the sub pad adjacent to the seat surface member, wherein each of the openings has a dimension greater than a dimension of the air distribution passage in a direction substantially perpendicular to a longitudinal direction of the air distribution passage.

2. The seat air conditioning unit according to claim 1, wherein the opening has substantially an elliptic shape and a major axis of which is substantially perpendicular to the longitudinal direction of the air distribution passage.

3. The seat air conditioning unit according to claim 1, wherein the opening at a downstream position of the air distribution passage is larger than that at an upstream position of the air distribution passage.

4. The seat air conditioning unit according to claim 1, wherein the through holes are located in an area that is separated from a downstream end of the air introduction passage by a predetermined distance.

5. The seat air conditioning unit according to claim 1, wherein the main pad forms a groove into which the seat surface member is partially squeezed,
wherein the groove communicates with the air distribution passage through a communication passage formed on the surface of the main pad.

6. The seat air conditioning unit according to claim 5, wherein the communication passage is disposed to extend radially with respect to the air introduction passage.

7. The seat air conditioning unit according to claim 1, wherein the seat has a seat bottom and a backrest,
wherein each of the seat bottom and the backrest has the air passage.

8. The seat air conditioning unit according to claim 7, wherein each of the seat bottom and the backrest has the blower unit.

9. The seat air conditioning unit according to claim 7, wherein the air distribution passages extend toward front and rear ends of the seat bottom.

10. The seat air conditioning unit according to claim 7, wherein the air distribution passages extend toward top and bottom ends of the backrest.

11. The seat air conditioning unit according to claim 7, wherein the seat member of the seat bottom includes a cover pad disposed between the sub pad and the seat surface member, and the cover pad has air permeability.

12. The seat air conditioning unit according to claim 1, wherein the air distribution passages are formed into grooves on the surface of the main pad adjacent to the sub pad.

* * * * *